US010382265B1

United States Patent
Anburose et al.

(10) Patent No.: US 10,382,265 B1
(45) Date of Patent: *Aug. 13, 2019

(54) REVERSIBLE YANG-BASED TRANSLATORS

(71) Applicant: Juniper Networks, Inc., Sunnyvale, CA (US)

(72) Inventors: Nirmal Anburose, Bangalore (IN); Chandrasekhar A, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/687,990

(22) Filed: Aug. 28, 2017

(51) Int. Cl.
  *G06F 15/16* (2006.01)
  *H04L 12/24* (2006.01)
  *H04L 29/12* (2006.01)
  *H04L 29/06* (2006.01)

(52) U.S. Cl.
  CPC ...... *H04L 41/0816* (2013.01); *H04L 41/0226* (2013.01); *H04L 61/2076* (2013.01); *H04L 63/20* (2013.01)

(58) Field of Classification Search
  CPC ............... H04L 29/08072; H04L 29/06; H04L 61/2076; H04L 63/20; H04W 4/02
  USPC ................... 709/203, 220, 228, 229
  See application file for complete search history.

(56) References Cited

U.S. PATENT DOCUMENTS

| | | | | |
|---|---|---|---|---|
| 6,529,731 B2* | 3/2003 | Modzelesky | ...... | H04B 7/18539 455/427 |
| 7,213,068 B1* | 5/2007 | Kohli | ................. | H04L 41/0604 709/223 |
| 8,667,096 B2* | 3/2014 | DeHaan | .............. | H04L 41/0806 709/203 |
| 10,200,248 B1* | 2/2019 | Jiang | ................... | H04L 41/0889 |
| 2001/0012775 A1* | 8/2001 | Modzelesky | ...... | H04B 7/18539 455/427 |
| 2005/0075133 A1* | 4/2005 | Pinder | ............... | H04M 1/72527 455/557 |
| 2014/0317261 A1* | 10/2014 | Shatzkamer | ............ | G06F 9/455 709/223 |

(Continued)

OTHER PUBLICATIONS

IEEE Computer Society; "Part 11: Wireless LAN Medium Access Control (MAC) and Physical Layer (PHY) Specifications: Amendment 4: Enhancements for Very High Throughput for Operation in Bands below 6 GHz"; IEEE Standard 802.11ac™-2013 (Amendment to IEEE Std 802.11™-2012, as amended by IEEE Std 802.11ae™-2012.*

(Continued)

*Primary Examiner* — Khanh Q Dinh
(74) *Attorney, Agent, or Firm* — Shumaker & Sieffert, P.A.

(57) ABSTRACT

In general, techniques are described for generating reversible mappings for management systems. The management system may include an interface and a processor. The interface may communicatively couple the management system to network devices. The processor may generate a data structure that represents each expression of a forward mapping as a separate node of the data structure. The processor may also translate one or more of the expressions represented as the separate nodes in the data structure to corresponding one or more negated expressions so as to form a reverse mapping. Further, the processor may apply the reverse mapping to the low-level configuration of the first network device to obtain the high-level configuration.

20 Claims, 7 Drawing Sheets

(56) References Cited

U.S. PATENT DOCUMENTS

| | | | | |
|---|---|---|---|---|
| 2014/0317293 A1* | 10/2014 | Shatzkamer | ............ | G06F 9/455 709/226 |
| 2015/0124809 A1* | 5/2015 | Edsall | ..................... | H04L 47/20 370/390 |
| 2017/0126741 A1* | 5/2017 | Lang | ........................ | G06F 21/57 |
| 2017/0349914 A1* | 12/2017 | Cox | ..................... | C12N 15/111 |
| 2018/0337785 A1* | 11/2018 | Sanciangco | ........... | H04L 9/3226 |

OTHER PUBLICATIONS

IEEE Std 802.11aa™-2012, and IEEE Std 802.11ad™-2012)), Dec. 18, 2013; 425 pp. (Year: 2012).*

Harrington et al., "An Architecture for Describing Simple Network Management Protocol (SNMP) Management Frameworks," RFC 3411, Network Working Group, Dec. 2002, 60 pp.

Enns, "NETCONF Configuration Protocol," RFC 4741, Network Working Group, Dec. 2006, 89 pp.

Bjorklund et al., Yang—A Data Modeling Language for the Network Configuration Protocol (NETCONF), RFC 6020, Internet Engineering Task Force, IETF, Oct. 2010, 173 pp.

"Ensuring 802.11n and 802.11a/b/g Compatibility," White Paper, Fluke Networks, www.flukenetworks.com, Oct. 2011, 10 pp.

IEEE 802.11ad, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", IEEE Computer Society, Dec. 28, 2012, 628 pp.

U.S. Appl. No. 15/198,657, by Juniper Networks, Inc. (Inventors: Jiang et al.), filed Jun. 30, 2016.

* cited by examiner

REVERSIBLE YANG-BASED TRANSLATORS

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. In order to configure devices to perform the services, a user (such as an administrator) may write translation programs that translate high-level configuration instructions (e.g., instructions according to a network service model) to low-level configuration instructions (e.g., instructions according to a device configuration model). As part of configuration service support, the user/administrator may provide a service model and a mapping between the service model to a device configuration model.

In order to simplify the mapping definition for the user, NMS devices may be designed to provide the capability to define the mappings in a simple way. For example, some NMS devices provide the use of Velocity Templates and/or Extensible Stylesheet Language Transformations (XSLT). Such translators contain the translation or mapping logic from the high-level service model to the low-level device configuration model. Typically, a relatively small number of changes in the high-level service model impact a relatively large number of properties across device configurations. Different translators may be used when services are created, updated, and deleted from the high-level service model.

NMS devices allow defining of custom services on the fly. The services may spread across managed devices. There can be multiple levels of service abstractions, e.g., higher-level services, base service elements, and the like. Typical Service provider deployments contain higher-level services. There can be thousands of services running in the network. "Service provider Admins" may use command line interfaces (CLIs) and other tools to modify the configuration of a few services. These changes are then synched to Service objects in NM systems.

SUMMARY

In general, this disclosure describes techniques for managing network devices. In some instances, the techniques may enable a management system to implement reversible mappings from a low level model (LLM) to a high level model (HLM). The management system may utilize a translation language to define the mappings, where the translation provides for ways by which to negate expression while still maintaining reversibility. In providing reversibility, the management system may parse the translation language defining the mapping to create an abstract syntax tree, which the management system may traverse to verify and create the reverse mappings.

In one example, the techniques are directed to a method performed by a network management system (NMS) device that manages a plurality of network devices, the method comprising generating a data structure that represents each expression of a forward mapping as a separate node of the data structure, the forward mapping configured to translate a high-level configuration to a low-level configuration of a first network device of the plurality of network devices. The method also comprises translating one or more of the expressions represented as the separate nodes in the data structure to corresponding one or more negated expressions so as to form a reverse mapping, the reverse mapping configured to translate the low-level configuration of the first network device to the high-level configuration. The method further comprises applying the reverse mapping to the low-level configuration of the first network device to obtain the high-level configuration.

In another example, the techniques are directed to a network management system (NMS) device that manages a plurality of network devices, the NMS device comprising one or more interfaces to communicatively couple the NMS device to the plurality of network devices. The NMS device also comprises a processor, implemented using circuitry, configured to generate a data structure that represents each expression of a forward mapping as a separate node of the data structure, the forward mapping configured to translate a high-level configuration to a low-level configuration of a first network device of the plurality of network devices. The processor may also be configured to translate one or more of the expressions represented as the separate nodes in the data structure to corresponding one or more negated expressions so as to form a reverse mapping, the reverse mapping configured to translate the low-level configuration of the first network device to the high-level configuration, and apply the reverse mapping to the low-level configuration of the first network device to obtain the high-level configuration.

In another example, the techniques are directed to a computer-readable medium having stored thereon instructions that, when executed, cause one or more processors to generate a data structure that represents each expression of a forward mapping as a separate node of the data structure, the forward mapping configured to translate a high-level configuration to a low-level configuration of a first network device of the plurality of network devices, translate one or more of the expressions represented as the separate nodes in the data structure to corresponding one or more negated expressions so as to form a reverse mapping, the reverse mapping configured to translate the low-level configuration of the first network device to the high-level configuration, and apply the reverse mapping to the low-level configuration of the first network device to obtain the high-level configuration.

The details of one or more examples are set forth in the accompanying drawings and the description below. Other features, objects, and advantages will be apparent from the description and drawings.

DETAILED DESCRIPTION

Figure 1:
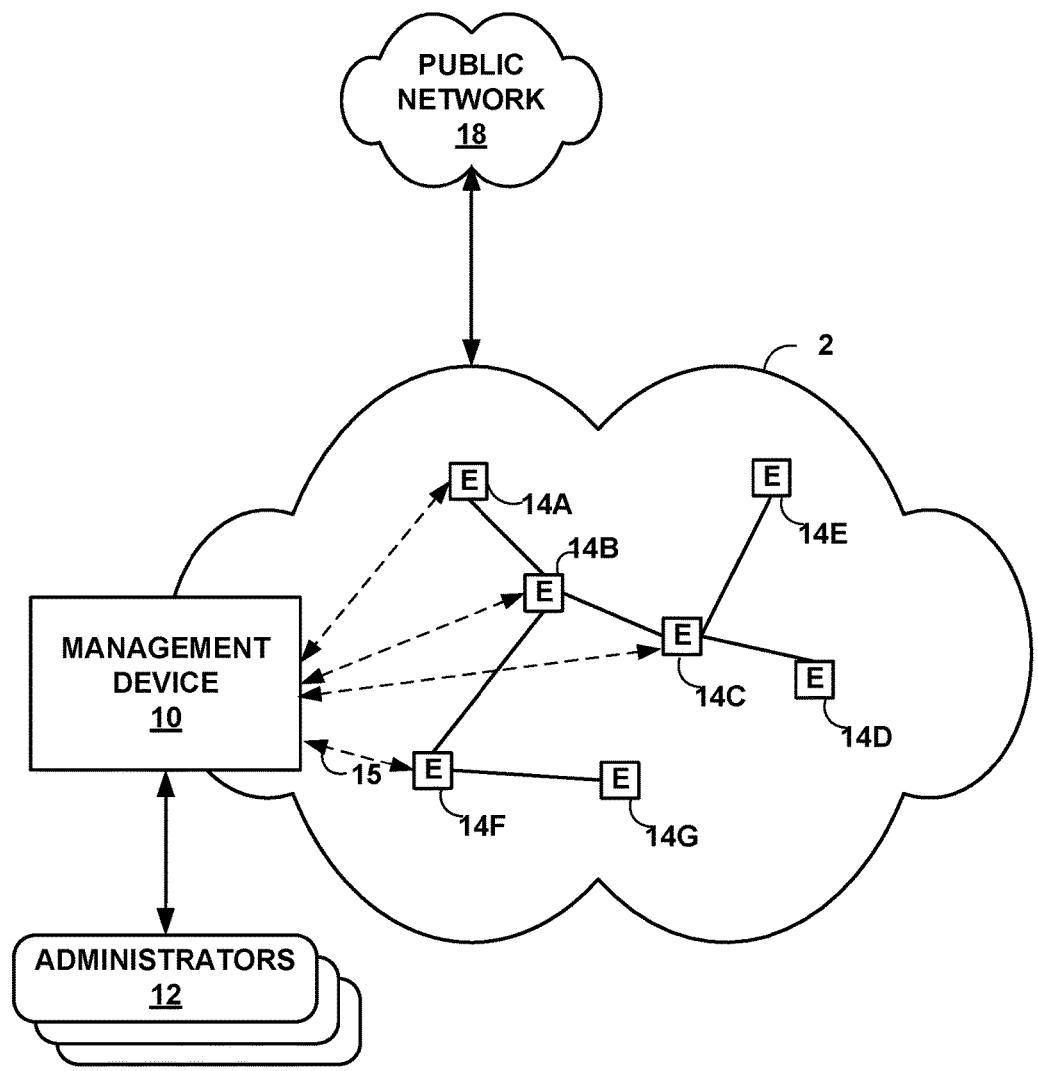
FIG. 1 is a block diagram illustrating an example including elements of an enterprise network that are managed using a management device in accordance with various aspects of the techniques described in this disclosure.

FIG. 1 is a block diagram illustrating an example including elements of an enterprise network 2 that are managed using a management device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion detection and prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Management device 10 is communicatively coupled to elements 14 via enterprise network 2. Management device 10, in some examples, forms part of a device management system, although only one device of the device management system is illustrated for purpose of example in FIG. 1. Management device 10 may be coupled either directly or indirectly to various elements 14. Once elements 14 are deployed and activated, administrator 12 uses management device 10 to manage the network devices using a device management protocol. One example device protocol is the Simple Network Management Protocol (SNMP) that allows management device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, management device 10, also referred to as network management system (NMS) or NMS device, and elements 14 are centrally maintained by an IT group of the enterprise. Administrator 12 interacts with management device 10 to remotely monitor and configure elements 14. For example, administrator 12 may receive alerts from management device 10 regarding any of elements 14, view configuration data of elements 14, modify the configurations data of elements 14, add new network devices to enterprise network 2, remove existing network devices from enterprise network 2, or otherwise manipulate enterprise network 2 and network devices therein. Although described with respect to an enterprise network, the techniques of this disclosure are applicable to other network types, public and private, including LANs, VLANs, VPNs, and the like.

In some examples, administrator 12 uses management device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, SSH, hypertext transfer protocol (HTTP), or other network session, to enter text in accordance with a defined syntax to submit commands to the managed element. In some examples, the user initiates an SSH session 15 with one of elements 14, i.e., element 14F in the example of FIG. 1, using management device 10, to directly configure element 14F. In this manner, a user may provide commands in a format for execution directly to elements 14.

Further, administrator 12 may also create scripts that can be submitted by management device 10 to any or all of elements 14. For example, in addition to a CLI interface, elements 14 also provide interfaces for receiving scripts that specify the commands in accordance with a scripting language. In a sense, the scripts may be output by management device 10 to automatically invoke corresponding remote procedure calls (RPCs) on managed elements 14. The scripts may conform to, e.g., extensible markup language (XML) or another data description language.

Administrator 12 uses management device 10 to configure elements 14 to specify certain operational characteristics that further the objectives of administrator 12. For example, administrator 12 may specify, for one of elements 14, a particular operational policy regarding security, device accessibility, traffic engineering, quality of service (QoS), network address translation (NAT), packet filtering, packet forwarding, rate limiting, or other policies. Management device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Management device 10 may establish NETCONF sessions with one or more of elements 14.

Management device 10 may be configured to compare a new set of high-level configuration data to an existing (or old) set of high-level configuration data, and apply the translation functions to the differences between the new and old high-level configuration data. In particular, management device 10 determines whether the new set of configuration data includes any additional configuration parameters relative to the old set of high-level configuration data, as well as whether the new set of configuration data omits any configuration parameters that were included in the old set of high-level configuration data.

Expressed another way, let the number of types of managed devices (e.g., types of elements 14) be represented by N, let the variable y represent low-level, device-specific configuration data, and let the variable x represent high-level configuration data. Management device 10 includes N translation functions $f_1(\ )$, $f_2(\ )$, ... $f_N(\ )$. These functions are configured accept the high-level configuration data (which may be expressed as structured input parameters, e.g., according to YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020). The functions are also configured to output respective sets of low-level device configuration data changes, e.g., device configuration additions and removals. That is, $y_1=f_1(x)$, $y_2=f_2(x)$, ... $y_N=f_N(x)$. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference.

Management device 10 may perform service abstraction to capture configurations of elements 14 in the context of the network. Management device 10 may use certain mapping rules between the service layer and the device layer. Management device 10 may follow the mapping rules to reconcile out of band (OOB) changes. Administrators 12 should have a complete understanding of the service and mapping rules to reconcile the OOB changes, which may not always be practical. The problem becomes even harder for the services that are configured on top of "High level BSE" services.

Management device 10 may address the following issues when handling OOB changes. Management device 10 may identify any conflicts between the OOB changes and the services in the NMS and mark the impacted service attributes as "out of synch." Management device 10 may also reverse map the OOB configuration difference back to the services in the NMS. Management device 10 may include a recommendation engine to help administrators 12 to resolve the configuration conflicts. Management device 10 may address these issues irrespective of the number of service layers defined in the system.

To address these issues, management device 10 may do the following in response to determining that OOB changes have taken place in one or more of elements 14. First, management device 10 may apply reverse mapping functions associated with changes in low level model (LLM) and determine the impacted service attributes. Management device 10 may then mark these service attributes as out of synch. Management device 10 then applies this process recursively to higher layers and marks the corresponding attributes in the upper layer service attributes as out of synch as well. At this stage, management device 10 still allows provisioning of other attributes in the services. When one of administrators 12 starts reconciling changes, management device 10 translates LLM changes to HLM changes and provides accept and reject options to the one of administrators 12. Management device 10 may group the attributes as a single operable unit based on the services' semantics during the reconciliation process. Management device 10 may also suggest the recommendation, while resolving the changes.

Out of band (OOB) changes include two kinds of changes, e.g., through a command line interface (CLI) or other applications of elements 14, that can bring a service "out of synch" to the network generally. First, a modification to service parameters through the CLI may be an OOB change. Second, expanding a service with more objects may be an OOB change (e.g., adding a new interface to a peer-to-peer (P2P) service).

Elements 14 may provide a CLI by which administrators 12 may provide OOB configuration updates directly to elements 14. A service performed by one or more of elements 14 may have been configured with certain values for properties. These properties can be modified through the CLI. This renders these service properties (or attributes) to be out of synch with the configuration information stored by management device 10.

For example, suppose there were a P2P service with 3 UNIs interfaces configured with bandwidth of "500." A user, through the CLI, could modify the Bandwidth for one interface alone. But the mapping rule for the service in management device 10 could be configuring the same bandwidth for all interfaces. This change therefore could not be imported for one interface alone. Accepting the change for this interface should update the bandwidth for other interface as well.

In some instances, a service offered by elements 14 can be extended with more objects (e.g., interfaces) through the CLI. Though, sometimes this change does not conflict with any of the service attributes in management device 10, configuration information stored by management device 10 is not in synch with the configuration of one or more of elements 14. Management device 10 should also detect these changes, and mark the corresponding service attributes as out of synch. At this stage, the service should be allowed to provision. As part of reconciliation, the change should be promoted/rejected/accepted to bring consistency between management device 10 and elements 14. While promoting these configuration options, management device 10 should make sure the mapping rule integrity is not violated for these additional endpoints (elements 14). This step may lead to the provisioning of additional options to the additional configuration objects.

As described above, management device 10 may apply the reverse mapper functions to the LLM to obtain the corresponding HLM. These reverse mapper functions may, however, be of limited use when considering complex mappings involving one-to-many mappings, external API calls and/or expression negation. Furthermore, management device 10 may not employ the reverse mapper functions with respect to XLST and scripts, as XSLT and scripts may not be reversible.

In accordance with the techniques described in this disclosure, management device 10 may utilize a new mapping language that allows for complex mapping expressions, and which supports negation of expressions. Also, management device 10 may compile the mappings into Python code, so such mappings may not incur any additional performance cost, in terms of execution time and memory. Furthermore, these expressions may be used inside existing translation frameworks, like Python scripts or XSLT.

The translation language may support multiple constructs, allowing the definition of expressions. The term "expressions" refers to a combination of the constructs defined in more detail below, that specifies a forward mapping. Each of the constructs are potentially reversible, allowing management system 10 to negate each of the expressions to form a reverse mapping. A forward mapping may allow for translation of a HLM (or, in other words, a high-level configuration) to a LLM (or, in other words, a low-level configuration), while a reverse mapping may allow for a reverse translation from the LLM to the HLM in order to accommodate out-of-band (OOB) changes, and other issues that arise when utilizing management system 10 to configure elements 14.

In operation, management system 10 may generate a data structure that represents each expression of a forward mapping as a separate node of the data structure. The data structure may include a graph, a linked-list, a tree, a trie, or any other form of data structure capable of representing expressions of the forward mapping.

Management system 10 may translate one or more of the expressions represented as the separate nodes in the data structure to corresponding one or more negated expressions so as to form the reverse mapping. Management system 10 may traverse each node of the data structure, substituting the expression represented by each node with a negated expression comprising one or more additional nodes. Management system 10 merge the nodes representing the negated expressions in instances described below in more detail. As such, management system 10 may form a reverse mapping from complex forward mappings, including those that include conditional expressions. Conditional expressions may include expressions having a "when" condition followed either by an argument capable of being evaluated as true or false, or an inline function, which are further described below.

Management system 10 may then apply the reverse mapping with various conditions occur, such as an OOB change, which may need to be resolved prior to deploying the LLM to one or more of elements 14. Management 10 may apply the reverse mapping to the LLM to obtain the HLM reflective of the various issues. The network administrator may troubleshoot the more-readable HLM, altering the HLM to overcome the various conditions outlined above. Management system 10 may then apply the forward mapping to the altered HLM to once again generate the LLM. Management system 10 may next output the LLM to one or more of elements 14, configuring elements 14 in accordance with the LLM to, as one example, deploy one or more services within network 2.

Figure 2:
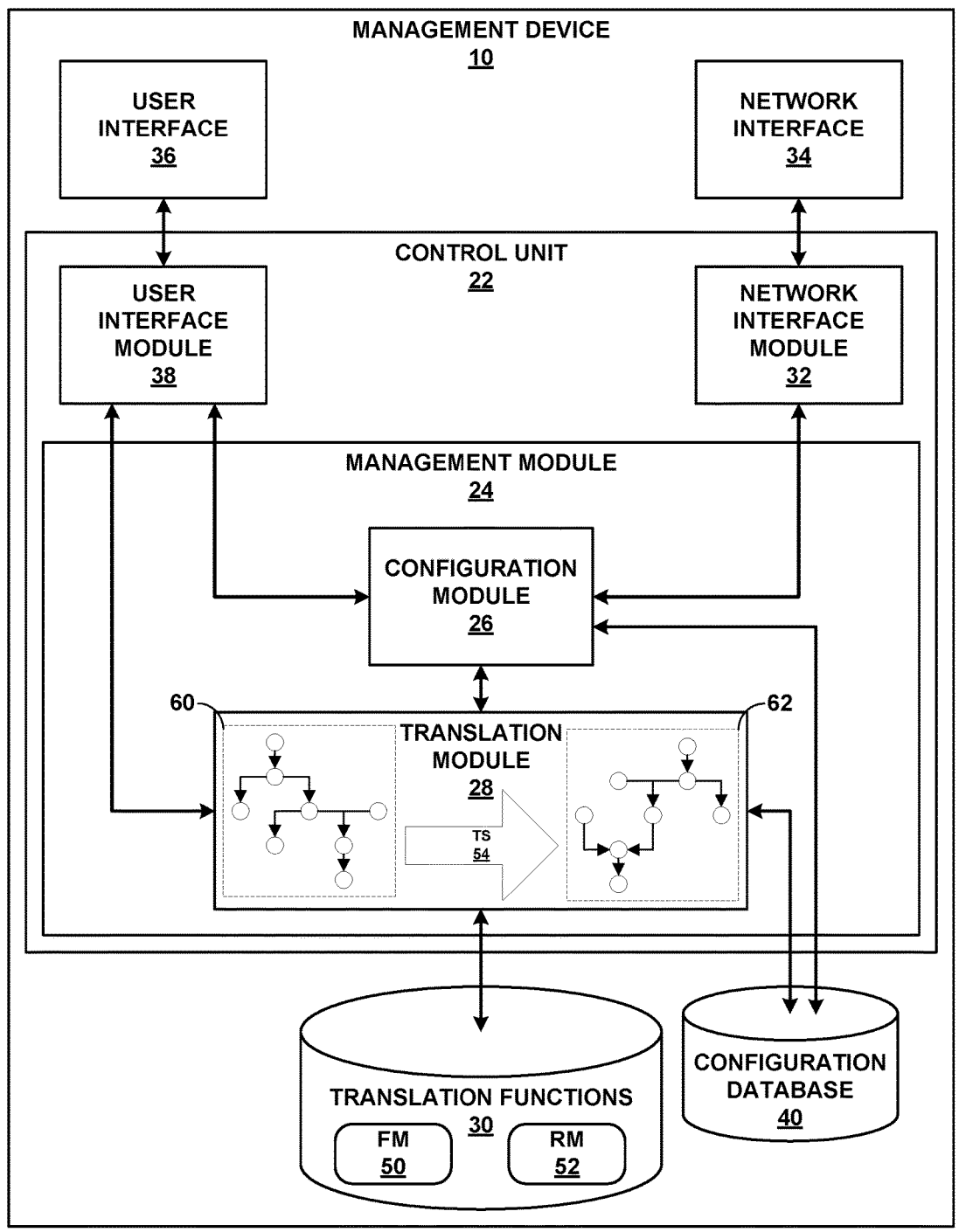
FIG. 2 is a block diagram illustrating an example set of components for the management device of FIG. 1.

FIG. 2 is a block diagram illustrating an example set of components for management device 10 of FIG. 1. In this example, management device 10 includes control unit 22, network interface 34, and user interface 36. Network interface 34 represents an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n/ac or other such wireless protocols). Management device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with management device 10, e.g., to provide input and receive output. For example, user interface 36 may represent one or more of a monitor, keyboard, mouse, touchscreen, touchpad, trackpad, speakers, camera, microphone, or the like. Furthermore, although in this example management device 10 includes a user interface, it should be understood that administrator 12 need not directly interact with management device 10, but instead may access management device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in a combination of software (including firmware and/or middleware) and hardware (e.g., a processor).

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive high-level configuration instructions for a set of managed network devices from a user, such as administrator 12. Over time, the user may update the configuration instructions, e.g., to add new services, remove existing services, or modify existing services performed by the managed devices. The high-level instructions may be structured according to, as one example, YANG. In some examples, management module 24 also provides administrator 12 with the ability to submit translation functions that translation module 28 executes to transform high-level configuration instructions to device-specific, low-level configuration instructions, as discussed below.

Management device 10 also includes configuration database 40. Configuration database 40 generally includes information describing managed network devices, e.g., elements 14. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., high-level configuration information, or in some cases, both high-level configuration and low-level configuration information) for the managed devices (e.g., elements 14).

Translation module 28 determines which devices are managed using configuration database 40. Translation module 28 determines which of translation functions 30 to execute on the high-level configuration instructions based on the information of configuration database 40, e.g., which of the devices are to receive the low-level configuration instructions. Translation module 28 then executes each of the determined translation functions of translation functions 30, providing the high-level configuration instructions to the translation functions as input and receiving low-level configuration instructions.

Configuration module 26 may first determine an existing set of high-level configuration information for each service performed by the devices for which configuration is to be updated, e.g., by retrieving the existing set of high-level configuration information for each of the services from configuration database 40. Configuration module 26 may then compare the existing set of high-level configuration information to the newly received set of high-level configuration information, and determine differences between the existing and newly received sets of high-level configuration information. Configuration module 26 may then pass these differences to translation module 28, for translation into respective sets of low-level configuration information. Configuration module 26 also updated the existing high-level configuration information recorded in configuration database 40 based on the newly received set of high-level configuration information.

Translation module 28 may generate two different types of translation functions 30, which are referred to above as forwarding mappings and reverse mappings. In the example of FIG. 2, the forward mappings are denoted "FM 50," while the reverse mappings are denoted as "RM 52." Translation module 28 may automatically generate RM 52 from corresponding ones of FM 50 using a translation script 54 ("TS 54") defined in accordance with a translation language described in more detail below.

Translation module 28 may receive one of FM 50 from user interface module 38 and generate a data structure 60 that represents each expression of the received one of FM 50 as a separate node (which are shown as circles in data structure 60) interconnected by edges (which are shown as arrows in data structure 60) defining relationships between the expressions represented by the nodes. Translation module 28 may then translate one or more of the expressions represented by the nodes in data structure 60 to corresponding one or more negated expressions represented by nodes of a data structure 62 (which are again represented by the circles) interconnected by edges (which again are represented by arrows) defining relationships between the negated expressions. That is, administrator 12 may define TS 54 in accordance with the translation language, which translation module 28 may execute to translate the one or more of the expressions represented as the separate nodes in data structure 60 to the corresponding one or more negated expressions represented by the nodes of data structure 62. Translation module 28 may complete the translations by traversing the nodes of data structure 62 according to the edges between the nodes to form one of RM 52 corresponding to the received one of FM 50.

In some instances, one or more of the expressions cannot be negated, such as when two variables are used rendering the outcome nondeterministic. In these instances, translation module 28 may generate one or more warnings indicating that a negated expression corresponding to the one of the expressions of data structure 60 cannot be negated. Administrator 12 may then address these warning prior to completing the generation of the corresponding one of RM 52, and applying the received one of FM 50 to HLM. In some instances, administrator 12 may resolve the warning manually and complete generation of data structure 62 representative of the corresponding one of RM 52. The warning are described in more detail below with respect to the detailed discussion of the translation language.

In this way, the techniques of this disclosure may enable management system 10 to implement reversible mappings from a high level model (HLM) to a low level model (LLM). Management system 10 may utilize a translation language to define the mappings, where the translation provides for ways by which to negate expression while still maintaining reversibility. In providing reversibility, management system 10 may parse the translation language defining the mapping to create an abstract syntax tree (e.g., data structure 60), which the management system may traverse to verify and create the corresponding one of RM 52.

Figure 3A:
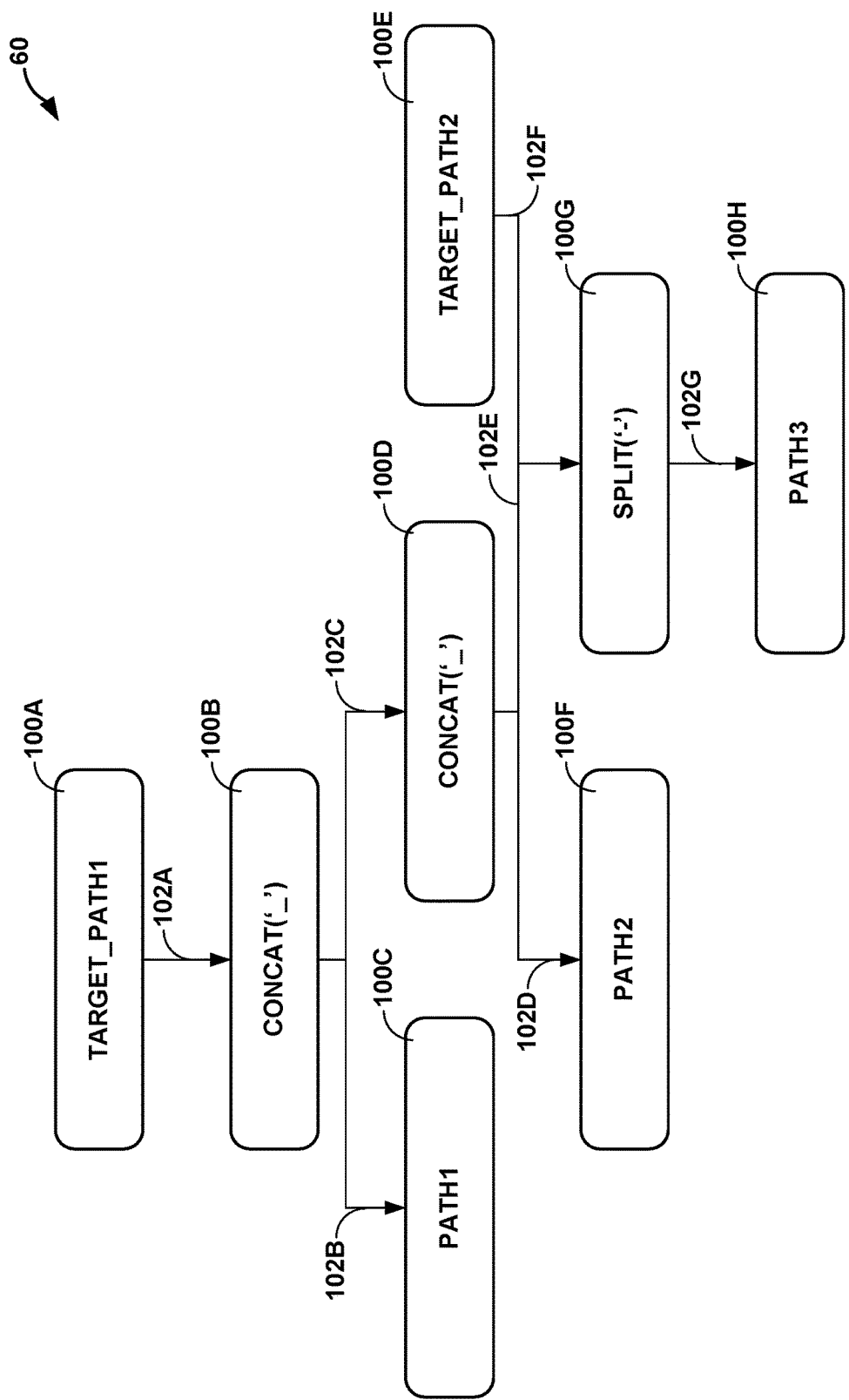
FIGS. 3A and 3B are block diagrams illustrating the data structure shown in the example of FIG. 2 in more detail.
Figure 3B:
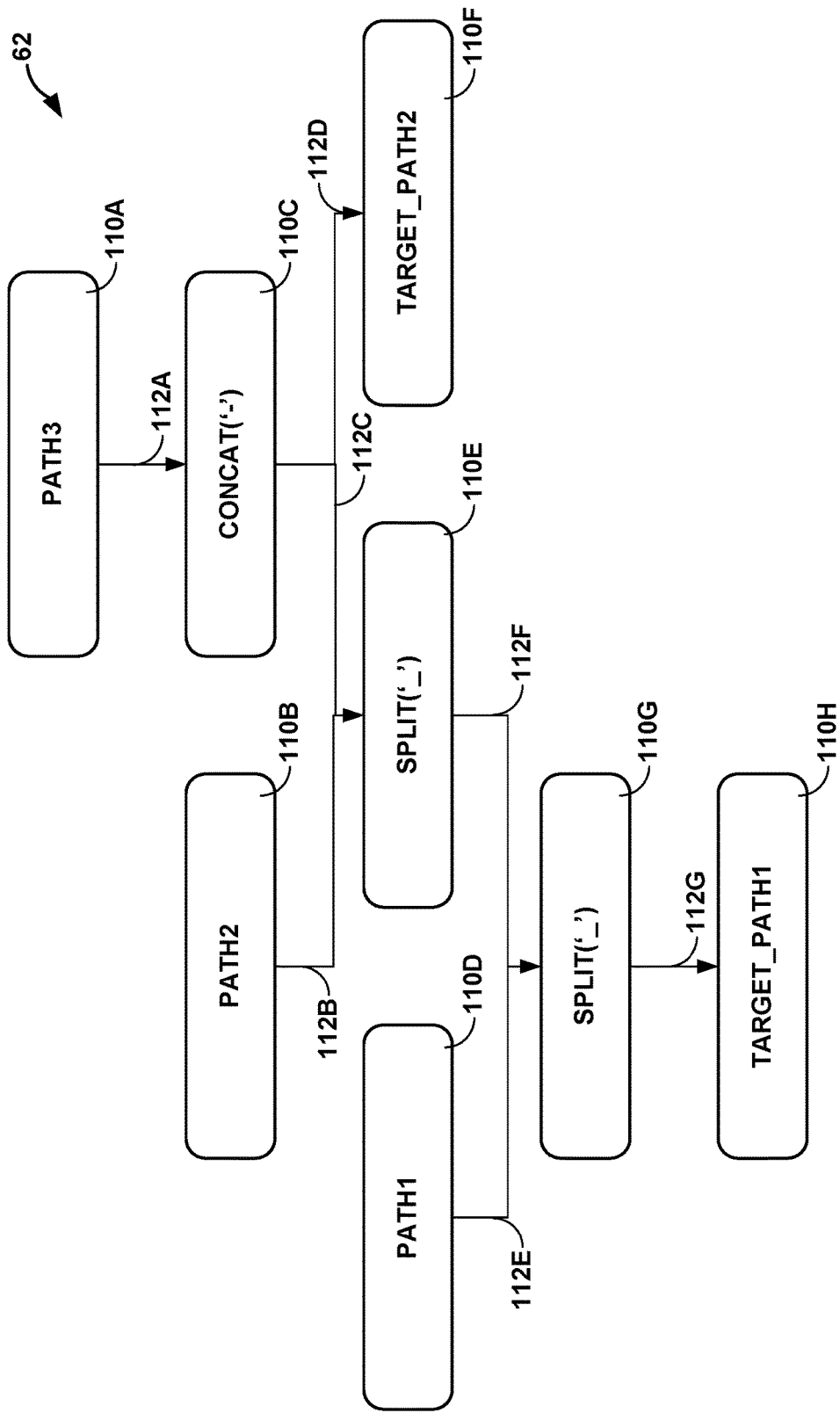

FIGS. 3A and 3B are block diagrams illustrating the data structure shown in the example of FIG. 2 in more detail. representative of a forward mapping. In the example of FIG. 3A, data structure 60 representative of the received one of FM 50 is shown in more detail. Data structure 60 includes nodes 100A-100H ("nodes 100") and edges 102A-102G ("edges 102"), where edges 102 define relationships between nodes 100.

Translation module 28 may validate, as part of mapper compilation, the received one of forward mapping 50 with a schema, and build data structure 60, which may also be referred to as a "syntax tree 50," for any inline functions and custom functions. Translation module 28 may then generate data structure 62 shown in more detail in FIG. 3B that represents a corresponding one of RMs 52. As shown in the example of FIG. 3B, data structure 62 (which may also be referred to as "reverse syntax tree 62") includes nodes 110A-110H ("nodes 110") and edges 112A-112G ("edges 112"), where edges 112 define relationships between nodes 110.

Referring back to FIG. 3A, syntax tree 60 represents an example of two nested concatenate/split code structures (where "concatenate" may be abbreviated as "concat" and also referred to as an "append"). Again, FIG. 3A shows syntax tree 60 for the forward mapping and FIG. 3B shows the corresponding syntax tree 62 representative of the corresponding reverse mapping 52.

Syntax tree 60 corresponds to the following expression: target_path1=concat('_', path1, concat('_', path2, split('-', path3)[0])), while syntax tree 62 corresponds to the following expression: target_path2=split('-', path3)[1]. Translation module 28 may translate each of the expressions represented by nodes 100 to a negated version of each node. For example, translation module 28 may translate a 'concat' function as shown in FIG. 4.

Figure 4:
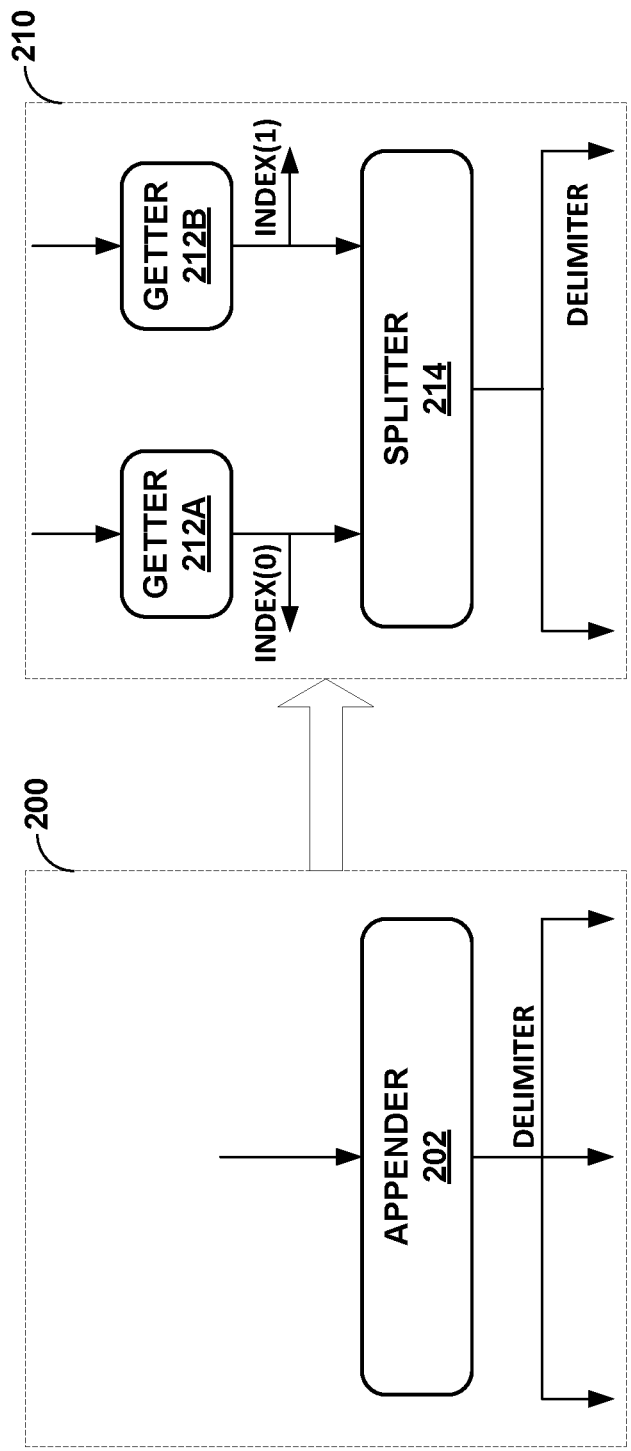
FIG. 4 is a block diagram illustrating translation of a node of a data structure formed in accordance with various aspects of the techniques described in this disclosure.

FIG. 4 is a block diagram illustrating translation of a node of a data structure formed in accordance with various aspects of the techniques described in this disclosure. As shown in the example of FIG. 4, a node 200 representative of a concat function (which may also be referred to as an append function) includes an appender 202 that receives an input, and appends the input to an existing string. Translation module 28 may translate node 200 into node 210, which represents a negated version of node 200. Node 210 includes two getters 212A and 212B ("getters 212") and a splitter 214. Each of getters 212 retrieve a string specified at respective index(0) and index (1) of the appended string, providing each string to splitter 114. Splitter 114 may split the values denoted by the delimiter, thereby negating the append function implemented by node 200.

Returning to FIG. 3A, translation module 28 may translate syntax tree 60 into reverse syntax tree 62 by reversing the direction of the links (i.e., shown as edges 102 in the example of FIG. 3A) in the forward mapping syntax tree 60 and replacing each function represented by each of nodes 100 with its corresponding reverse function, thereby generating nodes 110.

In some instances, translation module 28 may optimize or otherwise simply reverse syntax tree 62 using a merge operation. The following provides some pseudocode for merge syntax trees.

1) Function 1: Merge Syntax Trees
Find all the merge points in all the syntax trees (e.g., getters may form the merge points).
Get the only child of the merge point and see if it is shared by any other merge points.
If the merge point is shared by any other merge points, update the parent list of the child with all the merge points, which share that child.
If there is any unused index, then throw a warning that the expression cannot be negated.

Figure 5:
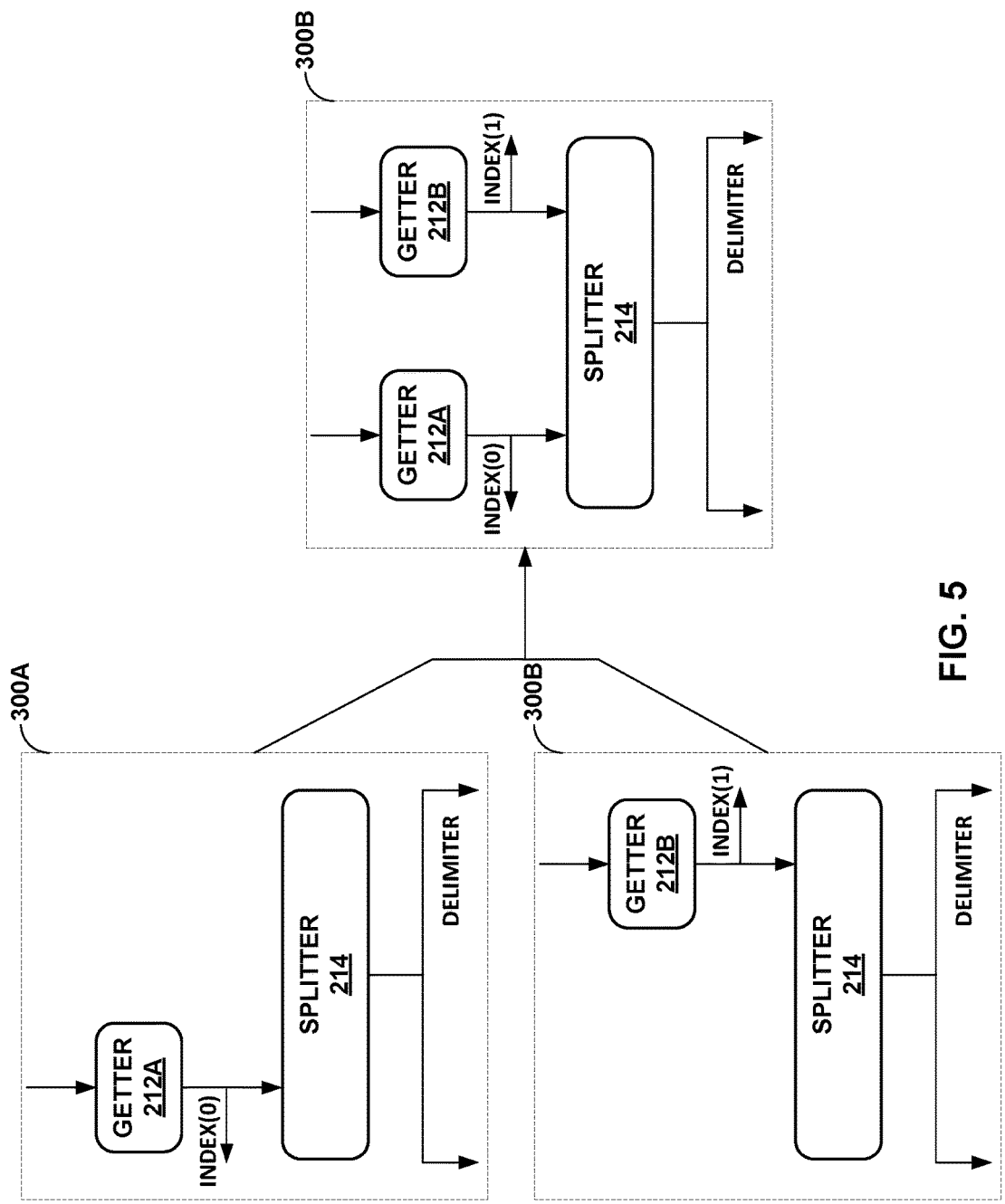
FIG. 5 is a block diagram illustrating merger of nodes within a reverse syntax tree in accordance with various aspects of the techniques described in this disclosure.

FIG. 5 is a block diagram illustrating merger of nodes within a reverse syntax tree in accordance with various aspects of the techniques described in this disclosure. In the example of FIG. 5, translation module 28 may merge node 300A representative of split('.', XPATH1)[0] and node 300B representative of split('.', XPATH1)[1] in to one node 302 in accordance with the above pseudocode.

Translation module 28 may also perform additional operations, such as the following listed below.

2) Function 2: Negate Expressions
Iterate through all the root expressions.
Do the following recursively.
Get the children of current node.
Negate current expression.
If the negated expression list is not empty, add the negated node as child to all the negated children at the returned index.
Else, return all the negated child and their indices.
If any of the children is of type XPATH, it is set as target XPATH of current node. Add current node to negated expression root list.

3) Function 3: Negate Conditions
If the condition involves only one XPATH and does not involve any Boolean operators like AND or OR and involves only 'equals' operator and the associated mapping expression is a constant, then just create an equals function with the constant mapping. For example, <mtu when='eq(' service/mtu', 1200)'>2400</mtu> creates the following negated expression. <mtu when='eq('configuration/interface/mtu', 2400)'>1200</mtu>.

Else, map the XPATH in the condition with the source XPATH expression mapped to it.

Optimize and remove if there are any redundant expressions. Ex: lower(upper('configuration/firewall/filter/name')) is optimized to simply the XPATH 'configuation/firewall/filter/name'. This is achieved using the following steps.

1) Recursively do the following from root condition expression.
2) Negate current expression.
3) If the expression has exactly one child and if the negated expression type and the child type is same and if the constants involved in the negated expression and the only child are same, then compare the children of the match and the negated expression recursively.
4) When match is not found for a child, add it to new child list.
5) If the current expression's parent is empty, then return the child list's first item as condition. If the child list has more than one item, then optimization is skipped.
6) Else, add the entries of child list as children to current expression's parent. Current expression is removed from its parent.

Figure 6:
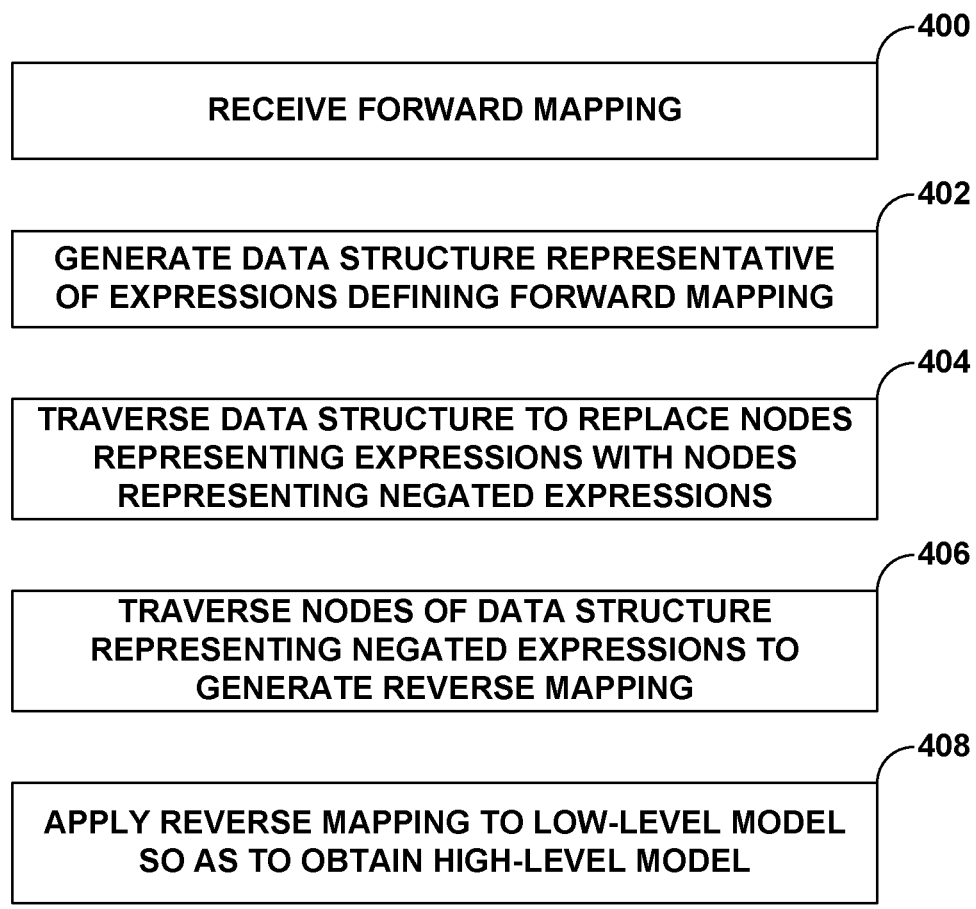
FIG. 6 is a flowchart illustrating exemplary operation of the translation module shown in FIG. 2 in generating a reverse mapping in accordance with various aspects of the techniques described in this disclosure.

FIG. 6 is a flowchart illustrating exemplary operation of translation module 28 in generating a reverse mapping in accordance with various aspects of the techniques described in this disclosure. As described above, translation module 50 may first receive one of FM 50 (400). The following is an example of FM 50 (from Open-config Interfaces to Junos interfaces).

```
<configuration                          srcschema="oc-device"
    targetschema="junos">
  <interfaces>
    <interface    loop-context='#configuration/interfaces/
        interface#'>
      <name>
        #name#
      </name>
      <flexible-vlan-tagging/>
      <mtu>
        #tconfig/mtu#
      </mtu>
      <encapsulation>
        #config/ocifext:encapsulation#
      </encapsulation>
    </interface>
  </interfaces>
</configuration>
```

The above, FM 50, includes the mappings (which may also be referred to as expressions) from a source data model to a target data model. The target data model paths are set forth in XML form. The source model XPATHs are set forth within '#' symbols. The following explains the mapping language used in forming FM 50.

For list mappings, when the "List key of Source model path" refers the "Target model path:"
If the "Target Model path" is key in List, the List element is repeated, based on the Source List entries.
If the "Target Model path" is element in List, the List element is repeated, based on Source List entries. In this case, the assumption is the "Target key mapped source path", would be unique in the input. Otherwise throw error.

For leaf-list mappings, the following applies:

The "leaf-list" in source model can be mapped to "List" or "leaf-list" in the target model.

If the "leaf-list" is mapped to List in the target model, the key should be referred to the leaf-list of the source model.

For ordered list mappings, the following applies:

Translation module 28 may map an ordered list in a source model to "Ordered List" or "List" in the target model.

If both the mapped lists are "Ordered by User", translation module 28 may copy insert before, after, first, last operations to the target model. Otherwise, translation module 28 will update as a normal list.

For ordered leaf-list mappings, translation module 28 may map ordered leaf-list in the source model to "leaf-List" in the target model.

For conditional mappings (which, again, may be referred to as "expressions"), the following applies:

"when" statement makes mappings conditional.

When statements can be included along with the "leaf" or "List element" mappings.

The Mapping statement is only valid when the condition specified by the "when" statement is satisfied. The statement's argument is an XPath expression or Inline function that should be evaluated to true to enable the mappings.

To make List element mapping conditional, the "when" condition should be included along with the key.

In this manner, FM 50 may include a conditional expression followed by an argument that is evaluated as either true or false. Translation module 28 may translate, in response to determining that the "when" condition is evaluated as being true, the conditional expression including the "when" condition to the negated expression so as to form the corresponding RM 52.

The following is an example of a conditional "when" expression.

```
<configuration      srcschema="oc-device" targetschema="junos">
  <interfaces>
    <interface    loop-context='#configuration/interfaces/interface#'>
      <name>
        #name#
      </name>
      <flexible-vlan-tagging when="eq(#tagging#, 'true')"/>
      <mtu>
        #config/mtu#
      </mtu>
      <encapsulation    when="and(eq(#tagging#, 'true'), #v-id#)">
        #config/ocifext:encapsulation#
      </encapsulation>
      <vlan-id #v-id#</vlan-id>
    </interface>
  </interfaces>
</configuration>
```

For loop context expressions, the loop context enables the mapper to loop through the list of entries in source model and maps the source path to target path. In below example, interface would be looped with source model path #configuration/interfaces/interface#

```
<configuration      srcschema="oc-device" targetschema="junos">
  <interfaces>
    <interface    loop-context='#configuration/interfaces/interface#'>
      <name>
        #name#
      </name>
      <flexible-vlan-tagging/>
      <mtu>
        #config/mtu#
      </mtu>
      <encapsulation>
        #config/ocifext:encapsulation#
      </encapsulation>
    </interface>
  </interfaces>
</configuration>
```

For leafrefs expressions, the following applies:

The leaf-referred attributes in the source model can be accessed as part of the referrer objects.

The mapper interpreter (represented by translation module 28) automatically resolves the referred object, while translating.

For example, in below data model, the YANG construct for the input-filter is as follows:

```
leaf input-filter {
  type leafref {
  path "/configuration/firewall/filter";
  }
}
```

Sample input:

```
<Configuration>
  <interface>
  <name>ge-0/0/1</name>
  <input-filter>filter1</input-filter>
  </interface>
  <firewall>
  <filter>ge-0/0/1</filter>
  <terms> . . . </terms>
  </firewall>
</Configuration>
```

The corresponding mapper can be as below. Here the "terms" can be directly referred in below path-input-filter/terms

```
<configuration      srcschema="oc-device" targetschema="junos">
  <interfaces>
    <interface    loop-context='#/configuration/interfaces/interface#'>
      <name>
        #name#
      </name>
      . . .
      <terms loop-context='#input-filter/terms#'>
      . . .
      </terms>
    </interface>
  </interfaces>
</configuration>
```

For inline functions, the following applies:

Mappings can involve nested expressions.

System supports the following exemplary mapping expressions (which may also be referred to as "functions").

XPATH expression—Ex: #conf/if-name#
Appender—Ex: append('_',#conf/if-name#,#conf/interface-name#)
Splitter—Ex: split('_',#conf/if-name#)
List item getter—Ex: split('_',#conf/if-name#)[0]
Adder—Ex: add(5, #conf/if-name#)
Multiplier—Ex: multiplier(5, #conf/if-name#)
Divider—Ex: divide(5, #conf/if-name#)
Subtractor—Ex: subtract(5,#conf/uni-interface#)
To-upper-case—Ex: upper(#conf/uni-interface#)
To-lower-case—Ex: lower(#conf/uni-interface#)
Equator—Ex: eq(#conf/uni-interface#,'enable')
Not-equals—Ex: neq(#conf/uni-interface#,#conf/if-name#)
Intersection—Ex: and(#conf/uni-interface#,#conf/if-name#)
Union—Ex: or(#conf/uni-interface#,#conf/if-name#)
External script invoker-
fn:tests.test_unit.complex_translator.irb.get_next_irb_rpc( )

These functions can be nested, as shown below.
Ex: append('_', path1, append('_', path2, split('-', path3)[0]))

Negated expression generation may not always be possible. For example, translation module 28 may not negate the following expression.
<target-path>multiplier(#conf/irb-count#, #conf/if-name#)</target-path>

Translation module 28 may not negate the expression because translation module 28 may be unable to identify the mapping for the XPATH '#conf/if-name#' from the above expression. One of the operands needs to be a constant for the above expression to be reversible. To illustrate, consider the following example.
<target-path>multiplier(10, #conf/if-name#)</target-path>

Translation module 28 may determine the reverse inline function for the above as follows:
<if-name>divide(10, #target-path#)</if-name>

Translation module 28 may validate the above when a mapping expression is found in the mapper. Translation module 28 may then check if the expression is reversible. If determined not to be reversible, translation module 28 may provide a warning that the given expression is not reversible. As such, when one of the expression cannot be negated, translation module may generate a warning indicating that the negated expression corresponding to the one of the expressions cannot be generated.

An example root expression class is given below.
class Expression(object):
  _metaclass_=ABCMeta
  def_init_(self, data=None, children=None, constants=None, parents=None,
xpath=None, line=0, file_name=None):
    self.data=data
    self.type=_DEFAULT_TYPE
      self.children=list(children) if children is not None else list()
    self.parents=list(parents) if parents is not None else list()
    # XPATH is the target XPATH with which, the given expression is attached.
    self.xpath=xpath if xpath is not None else XPath()
    self.constants=list(constants) if constants is not None else list()
    self.is_merge_point=False
    self.negated_expression_generated=False
    self.line=line
    self.file_name=file_name
    self.is_boolean_operator=False
    self.constant_expression=None
    self._str=None
    self.expression_generated_str=False
    self.negated_sources=dict()
  def resolve_merge_point(self):
    """
    :return:
    """
    return None. list()
  def is_reversible(self):
    return True
  @abstract method
  def eval(self, context):
    return None
  def evaluate(self, context):
    #TODO Include caching here.
    return self.eval(context)
  @abstractmethod
  def generate_expression_str(self):
    pass
  def generate_negated_expressions(self):
    if not self.negated_expression_generated;
      self.negated_sources,
        self.negated_children=self.create_negated_expressions()
      self.negated_expression_generated=True
  @abstractmethod
  def create_negated_expressions(self):
    """
    This method returns the negated version of this expression object. One expression may be converted into
      more than one negated expressions. For example, the source expression,
        'target_path=append('_', source_path1, source_path2)'
      produces the following negated expressions.
        1) 'source_path1=get(split('_', target_path). 0)'
        2) 'source_path2=get(split('_', target_path), 1)'
      The produced expressions for source_path1 and source_path2 share the same split() function result.
    Note: This method is called only once by the framework and the results are cached.
    The negated() method
      returns data from the cache.
    :return:
    This method returns two dictionaries. The first one contains the roots of the generated syntax graph. It
      is a graph because, the generated syntax trees are merged. For example, for the above example, the
      generated negated 'get'expressions, share the same split expression.
      The second return value contains the list of leaf nodes in the merged trees.
      The list key denotes the index of the original child expressions in the parent.
    """
    pass
  def negated(self):
    """
    This method returns the negated version of this expression object. One expression may be converted into
      more than one negated expressions. For example, the source expression,
        'target_path=append('_', source_path1, source_path2)'
      produces the following negated expressions.
        1) 'source_path1=get(split('_', target_path), 0)'
        2) 'source_path2=getfsplit('_', target_path), 1)'

The produced expressions for source_path1 and source_path2 share the same split() function result.
:return:
This method returns two dictionaries. The first one contains the roots of the generated syntax graph. It is a graph because, the generated syntax trees ore merged. For example, for the above example, the
generated negated 'get' expressions, share the same split expression.
The second return value contains the list of leaf nodes in the merged trees.
The list key denotes the index of the original child expressions in the parent.
"""
```
    return self.negated_sources, self.negated_children
def_str_(self):
    return self._str
def_eq_(self, other):
    return       type(self)==type(other)       and
        self.children==other.children and\
        self.constants==other.constants          and
            self.data==other.data and self.type==other.type
def_ne_(self, other):
    return not self._eq_(other)
def_hash_(self):
    hash(self.children)^hash(self.constants)^hash(self.data)
        ^hash(self.type)
```
An example expression class for the Appender (Ex: append('_',#conf/if-name#,#conf/interface-name#)) is given below.
```
class Appender(Expression):
def_init_(self, data=None, children=None, constants=None,
    parents=None, xpath=None, line=0, file_name=None):
    super(Appender, self)._init_(data, children, constants,
        parents, xpath, line, file_name)
    self.type=_APPENDER_TYPE
    self.negated_sources=dict()
    self.negated_children_32 dict()
def eval(self, context):
    if not self.children:
        raise TranslateError('Attributes are mandatory for
            appending.',
            context.xpath, self, self.line, self.file_name)
    if len(self.children) !=2 or not self.constants or len(self.
        constants) !=1:
    raise TranslateError('Append requires exactly two parameters and one delimiter.',
        context.xpath, self, self.line, self.file_name)
    try:
        delimiter=self.constants[0].evaluate(ExecutionContext
            ())
        if not isinstance(delimiter, basestring):
            raise TranslateError('Delimiter must be a string.
                Found '+
                type(delimiter), context.xpath, self.constants[0],
                    self.line,
self.file_name)
    except TranslateError as e:
        raise TranslateError('First argument must be a constant.'+e.message,
            context.xpath, self.constants[0], self.line, self.file_
                name)
    is_list=True
    value=self.children[1].evaluate(context)
    if not isinstance(value, list):
        value_32 [value]
        is_list=False
    for i, item in enumerate(value):
        if isinstance(item, dict):
            item_value=item['@value']
        else:
            item_value=item
        appended_str=str(self.children[0].evaluate(context))+\
            str(self.constants[0].evaluate(context))+str(item_
                value)
        if isinstance(item, dict):
            value[i]['@value']=appended_str
        else:
            value[i]=appended_str
    return value if is_list else value[0]
def create_negated_expressions(self):
    if not self.children:
        raise TranslateError('Attributes are mandatory for
            appending.',
            self.xpath, self, self.line, self.file_name)
    if len(self.children) !=2 or not self.constants or len(self.
        constants) !=1:
        raise TranslateError('Append requires exactly two
            parameters and one delimiter.',
            self.xpath, self, self.line, self.file_name)
    delimiter=Constant(data=self.constants[0].data,
        line=self.line,
file_name=self.file_name)
    #TODO Check if the following is fine.
    argument1, argument2=None, None
    ec=ExecutionContext()
    try:
        argument1=self.children[0].evaluate(ec)
        if argument1:
            argument1=copy.copy(self.children[0])
            argument1.parents=list()
    except:
        pass
    try:
        argument2=self.children[1].evaluate(ec)
        if argument2:
            argument2=self.children[1]
            argument2.parents=list()
    except;
        pass
    splitter=Splitter(constants=[delimiter],    children=list(),
        parents=list(),
        constant_result1=Argument1,
            constant_result2=argument2,
        line=self.line, file_name=self.file_name)
    delimiter.parents.append(splitter)
    const1=Constant(data=0,                        line=self.line,
        file_name=self.file_name)
    const2=Constant(data=1,                        line=self.line,
        file_name=self.file_name)
    getter1=ListGetter(children=[splitter],          constants=
        [const1], line=self.line,
file_name=self.file_name)
    const1.parents.append(getter1)
    getter2=ListGetter(children=[splitter],          constants=
        [const2], line=self.line,
file_name=self.file_name)
    const2.parents.append(getter2)
    splitter.parents.append(getter1)
    splitter.parents.append(getter2)
    return {0: [getter1], 1: [getter2]}, {0: [splitter]}
```

```
def generate_expression_str(self):
    super(Appender, self).generate_expression_str()
    if not self.expression_generated_str:
        child1=str(self.children[0]) if self.children and len
            (self.children)>0 else 'None'
        child2=str(self.children[1]) if self.children and len
            (self.children)>1 else 'None'
        constant=str(self.constants[0]) if self.constants and len
            (self.constants)>0 else
'None'
    child1='"""'+child1+'"""'if len(self.children)>0 and\
        self.children[0].type==_CONSTANT_TYPE    else
            child1
    child2='"""'+child2+'"""' if len(self.children)>1 and\
        self.children[1].type==_CONSTANT_TYPE    else
            child2
    self._str='append('+'"""'+constant+'"""'+','+child1+','+
        child2+')'
    self,expression_generated_str=True
```

For containers with presence, the following applies:
Target model Container with presence can have a mapping through value attribute.
<ssh value="#device/configuration/system-settings/services/ssh/status#"/>
If the value is True, the container will be added.
If the value is False, the container will be removed.
If the value-referred path is not present in input, the mapping statement will be ignored.
For Leaf with EMPTY expressions, translation module 28 handles the Leaf with EMPTY type similar to the Container with presence.

Translation module 28 may next generate, in the manner described in detail above, data structure 60 representative of the above expressions defining FM 50 (402) and the relationships between such expressions. Translation module 28 may then traverse data structure 60 to replace nodes (e.g., nodes 100 shown in FIG. 3A) of data structure 60 representing the expressions with nodes representing negated expressions (e.g., nodes 110 shown in FIG. 3B and described in detail with respect to FIG. 4) (404). Translation module 28 may, for the reasons set forth in more detail above, apply RM 52 to LLM so as to obtain HLM (408).

Although not described in detail above, translation module 28 may handle custom functions. For custom functions that do not use any external mutable resource, translation module 28 may handle these types of custom functions that do not use any external mutable resource in the same way as default mappings. Mapping results for these custom functions are stored in the in-process cache. When a custom mapping function uses an external resource, which may change, translation module 28 handles such custom mappings differently. Translation module 28 may, for custom mapping functions using an external resource, not use in-process caching for storing the mapping results of these functions.

For example, when a mapping target value changes based on the number of network interfaces, which are operationally up, translation module 28 may not cache the mapping result in the local memory. Instead, translation module 28 may store the mapping result in a distributed cache, and invalidate the cached value every time any of the ports go up or down. The control for cache timeout and enable/disable options are given to the mapper function. If the external resource value is dynamic, translation module 28 may not cache the results.

The following is a custom mapper function definition, illustrated using the following example.

'/service/connectivity-settings/attribute1'→'device/config/attribute2'*3
As per the mapping, if attribute2==3, then attribute1 becomes 9.
The custom mapping function may be as given below.

```
import mapper_infra as mi
def transform_attribute1(translation_context):
    //target=source*3
    a=mi.source(['device', 'config', 'attribute2'])//Creates an XPATH expression
    b=mi.const(3)//Indicates a constant value
    c=mi.multiply(a, b)
    with mi.session( ) as s:
        c=s.run(translation_context, c, ['service', 'connectivity-settings', 'attribute1'])//multiplies two values and associates the result with the given XPATH.
```

The inbuilt function multiply has a reverse function of divide. In this case, the system will generate the negated function of divide('/service/connectivity-settings/attribute1', 3) and this expression will be attached to the XPATH, 'device/config/attribute2'.

There may be multiple advantages in the above approach. Translation module 28 may directly generate abstract syntax tree (AST) from s.run( ). The foregoing may avoid parsing of the code as a string. Translation module 28 may also automatically generate the reverse map function using the same approach used for parsing the inline map functions.

The user may use some third party libraries. The syntax for using third party libraries may, for example, resemble the following:
ct.fn('config_translator.complex_translators.irb_translator.get_next_irb_rpc', [device_id])

In this example, device_id is an expression object. When the module, irb_translator does not have a function with a name, reverse get_next_irb_rpc, translation module 28 may generate a warning indicating that the reverse function is not found for get_next_irb_rpc.

In this way, management system 10 may have more control in custom mappers and it may become easier to find errors in the custom functions. As such, management system 10 may determine which are the source XPATHs that are not yet mapped to any targets, which are the list keys that are not mapped yet, etc. If the user were to write a direct Python function, it may get difficult for management system 10 to figure out which XPATHs are translated in the custom function.

The following presents pseudocode for custom mappers.
1) When a mapper is uploaded, management system 10 parses the mapper and looks for one of the tags.
   a) User can call an external API and attach its results to a target XPATH, using the following syntax. The following is an example:
      <target>fn: config_translator.irb.get_next_irb_rpc( )/target>
   b) User can attach a custom function using the following syntax. The following is an example: <custom-translator>config_translator.irb.get_next_irb</custom-translator> This tag is placed directly under the mapper root tag. The system will automatically identify the source and target XPATHs attached to this custom function.
2) When the <target> tag mentioned above is found, management system 10 creates an external API invoker expression object, which takes care of calling the appropriate API. It also takes care of creating the negated API caller expression.

3) When the <custom-translator> tag mentioned above is found, management system 10 gets the instance of the method name mentioned and calls the method with the translation context with the mapper name and mapper compiler instance.
4) Step (3) will in turn call session.run( ) method, which will add the root expression list to the compiler. It also creates the negated expressions from the custom function and adds them to the compiler passed as part of the translation context.
5) The compiler then adds the expression trees to the map-lets based on the target paths set in them.

The techniques of this disclosure may enable the following:
1) A translation language, as an alternative to XSLT and scripts
2) A Compiler, which parses the complex mappings defined by the users and creates an abstract syntax tree, which can be easily traversed to create a reverse mapper
3) A list of complex mapping expressions is defined to handle complex translations
4) An approach to negate the expressions
5) An approach to negate the 'when' conditions and extract negated mappings from conditions, when possible
6) Plugin support for custom Python translation scripts and generation of reversed translations for them In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

What is claimed is:

1. A method performed by a network management system (NMS) device that manages a plurality of network devices, the method comprising:
    generating a data structure that represents each expression of a forward mapping as a separate node of the data structure, the forward mapping configured to translate a high-level configuration to a low-level configuration of a first network device of the plurality of network devices;
    translating one or more of the expressions represented as the separate nodes in the data structure to corresponding one or more negated expressions so as to form a reverse mapping, the reverse mapping configured to translate the low-level configuration of the first network device to the high-level configuration; and
    applying the reverse mapping to the low-level configuration of the first network device to obtain the high-level configuration.

2. The method of claim 1, wherein translating one or more of the expressions comprises translating a conditional expression to a negated conditional expression so as to form the reverse mapping, the conditional expression including conditional syntax.

3. The method of claim 2, wherein the conditional syntax includes a "when" condition followed by an argument that is evaluated as either true or false, and
    wherein translating the conditional expression including the "when" condition comprises translating, in response to determining that the "when" condition is evaluated as being true, the conditional expression including the "when" condition to the negated conditional expression so as to form the reverse mapping.

4. The method of claim 2, wherein the conditional syntax includes a reversible inline function, the reversible inline function comprising at least one of a path compare mapping expression, an append mapping expression, a split mapping expression, a list item retrieve mapping expression, an add mapping expression, a multiply mapping expression, a divide mapping expression, a subtract mapping expression, a convert uppercase mapping expression, a convert lowercase mapping expression, an equals mapping expression, a not-equals mapping expression, an intersection mapping expression, a union mapping expression, and a script invoke mapping expression.

5. The method of claim 1, wherein one of the expressions cannot be negated, and wherein the method further comprises generating a warning indicating that a negated expression corresponding to the one of the expression cannot be generated.

6. The method of claim 1, wherein the data structure comprises a tree data structure including the one or more separate nodes representative of the one or more expressions of the forward mapping,
wherein translating the one or more expressions comprises traversing the nodes of the tree data structure to replace each of the one or more expressions with the corresponding negated expression to output a translated tree data structure representative of the reverse mapping, and
wherein the method further comprises traversing nodes of the translated tree data structure representative of the corresponding negated expressions to form the reverse mapping.

7. The method of claim 1, wherein translating the one or more expressions comprises executing a translation script defined in accordance with a translation language to translate the one or more of the expressions represented as the separate nodes in the data structure to the corresponding one or more negated expressions so as to form the reverse mapping.

8. The method of claim 7,
wherein the translation language specifies one or more constructs, and wherein the constructs include a list mapping construct, a leaf-list mapping construct, an ordered list mapping construct, an ordered leaf-list mapping construct, a conditional construct, a loop context construct, a leaf reference construct, one or more inline function constructs, a container presence construct, and an empty leaf construct, each of the constructs having a corresponding negated construct.

9. The method of claim 1, wherein the expressions define a custom function, and
wherein translating one or more of the expressions comprises translating at least some of the expressions that define the custom function to corresponding negated expressions so as to form the reverse mapping.

10. A network management system (NMS) device that manages a plurality of network devices, the NMS device comprising:
one or more interfaces to communicatively couple the NMS device to the plurality of network devices; and
a processor, implemented using circuitry, configured to:
generate a data structure that represents each expression of a forward mapping as a separate node of the data structure, the forward mapping configured to translate a high-level configuration to a low-level configuration of a first network device of the plurality of network devices;
translate one or more of the expressions represented as the separate nodes in the data structure to corresponding one or more negated expressions so as to form a reverse mapping, the reverse mapping configured to translate the low-level configuration of the first network device to the high-level configuration; and
apply the reverse mapping to the low-level configuration of the first network device to obtain the high-level configuration.

11. The device of claim 10, wherein the one or more processors are configured to translate a conditional expression to a negated conditional expression so as to form the reverse mapping, the conditional expression including conditional syntax.

12. The device of claim 11,
wherein the conditional syntax includes a "when" condition followed by an argument that is evaluated as either true or false, and
wherein the one or more processors are configured to translate, in response to determining that the "when" condition is evaluated as being true, the conditional expression including the "when" condition to the negated conditional expression so as to form the reverse mapping.

13. The device of claim 11, wherein the conditional syntax includes a reversible inline function, the reversible inline function comprising at least one of a path compare mapping expression, an append mapping expression, a split mapping expression, a list item retrieve mapping expression, an add mapping expression, a multiply mapping expression, a divide mapping expression, a subtract mapping expression, a convert uppercase mapping expression, a convert lowercase mapping expression, an equals mapping expression, a not-equals mapping expression, an intersection mapping expression, a union mapping expression, and a script invoke mapping expression.

14. The device of claim 10, wherein one of the expressions cannot be negated, and
wherein the one or more processors are further configured to generate a warning indicating that a negated expression corresponding to the one of the expression cannot be generated.

15. The device of claim 10, wherein the data structure comprises a tree data structure including the one or more separate nodes representative of the one or more expressions of the forward mapping,
wherein the one or more processors are configured to traverse the nodes of the tree data structure to replace each of the one or more expressions with the corresponding negated expression to output a translated tree data structure representative of the reverse mapping, and
wherein the one or more processors are further configured to traverse nodes of the translated tree data structure representative of the corresponding negated expressions to form the reverse mapping.

16. The device of claim 10, wherein the one or more processors are configured to execute a translation script defined in accordance with a translation language to translate the one or more of the expressions represented as the separate nodes in the data structure to the corresponding one or more negated expressions so as to form the reverse mapping.

17. The device of claim 16, wherein the translation language specifies one or more constructs, and wherein the constructs include a list mapping construct, a leaf-list mapping construct, an ordered list mapping construct, an ordered leaf-list mapping construct, a conditional construct, a loop context construct, a leaf reference construct, one or more inline function constructs, a container presence construct, and an empty leaf construct, each of the constructs having a corresponding negated construct.

18. The device of claim 10, wherein the expressions define a custom function, and
wherein the one or more processors are configured to translate at least some of the expressions that define the custom function to corresponding negated expressions so as to form the reverse mapping.

19. A non-transitory computer-readable medium having stored thereon instructions that, when executed, cause one or more processors to:

generate a data structure that represents each expression of a forward mapping as a separate node of the data structure, the forward mapping configured to translate a high-level configuration to a low-level configuration of a first network device of the plurality of network devices;

translate one or more of the expressions represented as the separate nodes in the data structure to corresponding one or more negated expressions so as to form a reverse mapping, the reverse mapping configured to translate the low-level configuration of the first network device to the high-level configuration; and apply the reverse mapping to the low-level configuration of the first network device to obtain the high-level configuration.

20. The non-transitory computer-readable medium of claim 10, having stored thereon instructions that, when executed, cause the one or more processors to translate a conditional expression to a negated conditional expression so as to form the reverse mapping, the conditional expression including conditional syntax.

\* \* \* \* \*